United States Patent
Cooper et al.

(10) Patent No.: US 7,453,917 B1
(45) Date of Patent: Nov. 18, 2008

(54) SUPERSONIC ALL GAS-PHASE IODINE LASER

(75) Inventors: Christopher B. Cooper, Albuquerque, NM (US); Gerald C. Manke, Albuquerque, NM (US); Gordon D. Hager, Rio Rancho, NM (US); Timothy J. Madden, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 425 days.

(21) Appl. No.: 11/179,187

(22) Filed: Jul. 12, 2005

(51) Int. Cl.
*H01S 3/22* (2006.01)

(52) U.S. Cl. .............................. 372/55; 372/58; 372/60; 372/89; 372/90

(58) Field of Classification Search .................... 372/55, 372/58, 60, 89, 90
See application file for complete search history.

(56) References Cited

U.S. PATENT DOCUMENTS 6,459,717 B1 * 10/2002 Henshaw et al. .............. 372/58
6,785,315 B1 * 8/2004 Hook et al. .................... 372/55

OTHER PUBLICATIONS

Manke et al., "The measurement of gain in a supersonic, combustion-driven generator for NCl", Proc. of SPIE vol. 5792, Jun. 2005, pp. 97-108.*

* cited by examiner

*Primary Examiner*—Minsun Harvey
*Assistant Examiner*—Tod T Van Roy
(74) *Attorney, Agent, or Firm*—Kenneth E. Callahan

(57) ABSTRACT

A continuous wave laser based on the electronic $I^*(^2P_{1/2})$–$I(^2P_{3/2})$ transition of atomic iodine at 1.315 microns from the $NCl(a^1\Delta)+I(^2P_{3/2})$ energy transfer reaction using a transverse flow device having gas flow from an upstream subsonic combustor section through a converging-diverging supersonic slit nozzle to a downstream supersonic section and an intersecting optical resonator. Laser operation is achieved through the transformation of the gas phase chemical reagents, $D_2$ (deuterium), $F_2$ (fluorine), $NF_3$ (nitrogen trifluoride), DCl (deuterium chloride) HI (hydrogen iodide) in the subsonic section and $HN_3$ (hydrogen azide) in the supersonic section.

9 Claims, 2 Drawing Sheets

SUPERSONIC ALL GAS-PHASE IODINE LASER

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

Chemical lasers are devices that derive their population inversions from exothermic chemical reactions, whether directly or indirectly, and include photochemical-induced bond dissociation, radiative recombination of atoms or molecules, and energy transfer processes. In view of their generally efficient conversion of chemical potential into laser radiation, chemical lasers have been sought after for numerous applications in which lightweight, self-contained lasers are utilized.

On the first chemically-pumped electronic transition laser, continuous wave (cw) laser oscillation was achieved using the $I^*(^2P_{1/2})$–$I(^2P_{3/2})$ transition via the energy transfer reaction between the oxygen metastable, $O_2(a^1\Delta)$ and a ground state iodine atom, $I(^2P_{3/2})$. This chemistry forms the basis of the high-powered Chemical Oxygen Iodine Laser (COIL), which operates in the near infrared at 1.315 μm with cw power of up to 40 kW. The COIL uses a heterogeneous mixture of chlorine gas and an aqueous peroxide-based solution to generate the $I^*(^2P_{1/2})$. It is based on the following chemical mechanism, $$2O_2H^- + Cl_2 \rightarrow 2\ Cl^- + H_2O_2 + O_2(a^1\Delta) \tag{1}$$

$$nO_2(a^1\Delta) + I_2 \rightarrow O_2(X^3\Sigma^-) + 2\ I (n=2-5) \tag{2}$$

$$O_2(a^1\Delta) + I \rightarrow I^* + O_2(X^3\Sigma^-) \tag{3}$$

$$I^*(^2P_{1/2}) + H\nu \rightarrow I(^2P_{3/2}) + 2\ h\nu \tag{4}$$

The principal limitations of this device are derived from the aqueous ($H_2O$ based) chemistry. In general, the use of the aqueous reagents reduces the overall efficiency and increases the complexity of the system because the aqueous peroxide solution is heavy and difficult to engineer and control in a zero gravity environment. In addition, water ($H_2O$) quenches or destroys the $I^*(^2P_{1/2})$ lasing species. Finally, heat generated by reaction (1) is retained in the basic hydrogen peroxide mixture and must be removed to prevent further gas phase $H_2O$ generation.

As such, to make the COIL laser viable and robust in all environments (ground, air and space), extensive engineering is required to accommodate the aqueous chemistry. One approach to mitigate these drawbacks was the all gas phase laser system described in U.S. Pat. No. 6,459,717 hereby incorporated by reference. This cw subsonic all gas phase iodine laser (AGIL) eliminated the water-based chemistry and its attendant problems.

The subsonic AGIL is a device in which the energy required for laser operation is achieved through the transformation of the solely gas phase chemical reagents, $NF_3$ (nitrogen trifluoride), DCl (deuterium chloride) HI (hydrogen iodide) and $HN_3$ (hydrogen azide) into $I^*(^2P_{1/2})$ laser radiation at 1.315 μm. Helium is also used, but its role is limited to a buffer or carrier gas for these reagents. The chemical generation of $I^*(^2P_{1/2})$ lasing is based on a sequential process in which Cl and I atoms are produced, $$F + DCl \rightarrow DF + Cl, \tag{5}$$

$$Cl + HI \rightarrow HCl + I(^2P_{3/2}) \tag{6}$$

followed by $NCl\ (a^1\Delta)$ production, $$Cl + HN_3 \rightarrow HCl + N_3 \tag{7}$$

$$Cl + N_3 \rightarrow NCl(a^1\Delta) + N_2(X^1\Sigma) \tag{8}$$

and finally the energy transfer reaction between $NCl\ (a^1\Delta)$ and $I(^2P_{3/2})$ to generate $I^*(^2P_{1/2})$:

$$NCl\ (a^1\Delta) + I(^2P_{3/2}) \rightarrow NCl\ (X^3\Sigma) + I^*(^2P_{1/2}) \tag{9}$$

$$I^*(^2P_{1/2}) + h\nu \rightarrow I(^2P_{3/2}) + nh\nu\ (1.315\ \mu m\ laser\ radiation) \tag{10}$$

The demonstration of $I^*(^2P_{1/2})$–$I(^2P_{3/2})$ laser action using this mode and chemistry was performed in a transverse subsonic flow reactor. The essential features of this apparatus included a device for fluorine (F) atom production. The device can be an electrical discharge (DC), RF or microwave radiation, or chemical combustion. Fluorine atoms were generated using a 10 kW DC discharge of $NF_3$ in helium. The pressure in the system was regulated by flowing $N_2$ 1.5 meters downstream of the reactor cavity through a 3-cm choke orifice. Downstream of the fluorine atom injection point were nozzles or injectors for the insertion of DCl, HI and $HN_3$ into the flow stream.

DETAILED DESCRIPTION

The supersonic all gas iodine laser is a device in which the energy required for laser operation is achieved through the transformation of the gas phase chemical reagent, $D_2$ (deuterium), $F_2$ (fluorine), $NF_3$ (nitrogen trifluoride), DCl (deuterium chloride) HI (hydrogen iodide) and $HN_3$ (hydrogen azide) into $I^*(^2P_{1/2})$ laser radiation at 1.315 μm. Helium is also used, as a buffer/carrier gas for these reagents. The chemical generation of $I^*(^2P_{1/2})$ lasing is based on a sequential process in which F, Cl, and I atoms are produced via the following spontaneous reactions:

$$D_2 + F_2 \rightarrow 2\ DF + heat \tag{11}$$

$$F_2 + heat \rightarrow 2\ F \tag{12}$$

$$NF_3 + heat \rightarrow NF_{3-x} + xF \tag{13}$$

$$F + DCl \rightarrow DF + Cl \tag{14}$$

$$Cl + HI \rightarrow HCl + I(^2P_{3/2}) \tag{15}$$

This mixture is gas dynamically cooled and accelerated through a converging-diverging supersonic slit nozzle. Subsequent injection of $HN_3$ facilitates $NCl(a^1\Delta)$ and $I^*(^2P_{1/2})$ production via reactions (16) through (18):

$$Cl + HN_3 \rightarrow HCl + N_3 \tag{16}$$

$$Cl + N_3 \rightarrow NCl(a^1\Delta) + N_2 \tag{17}$$

$$NCl(a^1\Delta) + I(^2P_{3/2}) \rightarrow NCl(X^3\Sigma^-) + I^*(^2P_{1/2}) \tag{18}$$

Figure 1:
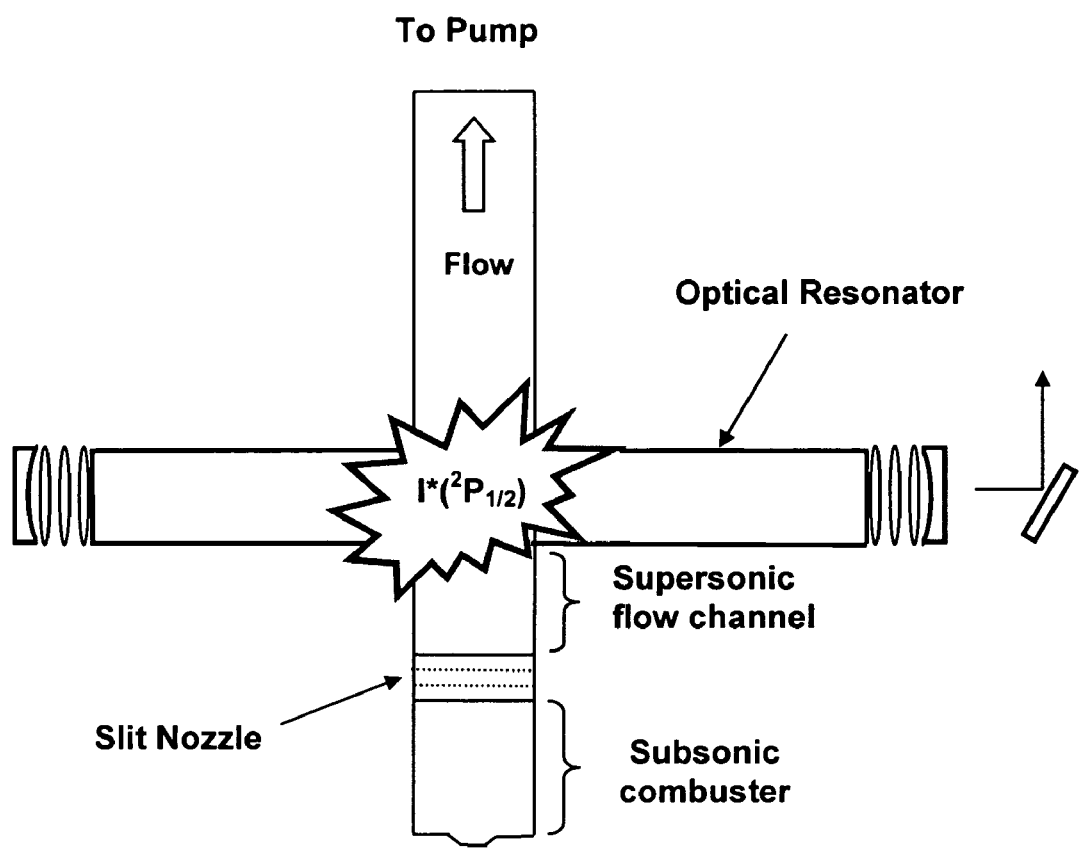
FIG. 1 is a diagram of the transverse subsonic/supersonic flow reactor and optical resonator apparatus used to demonstrate the supersonic AGIL.
Figure 2:
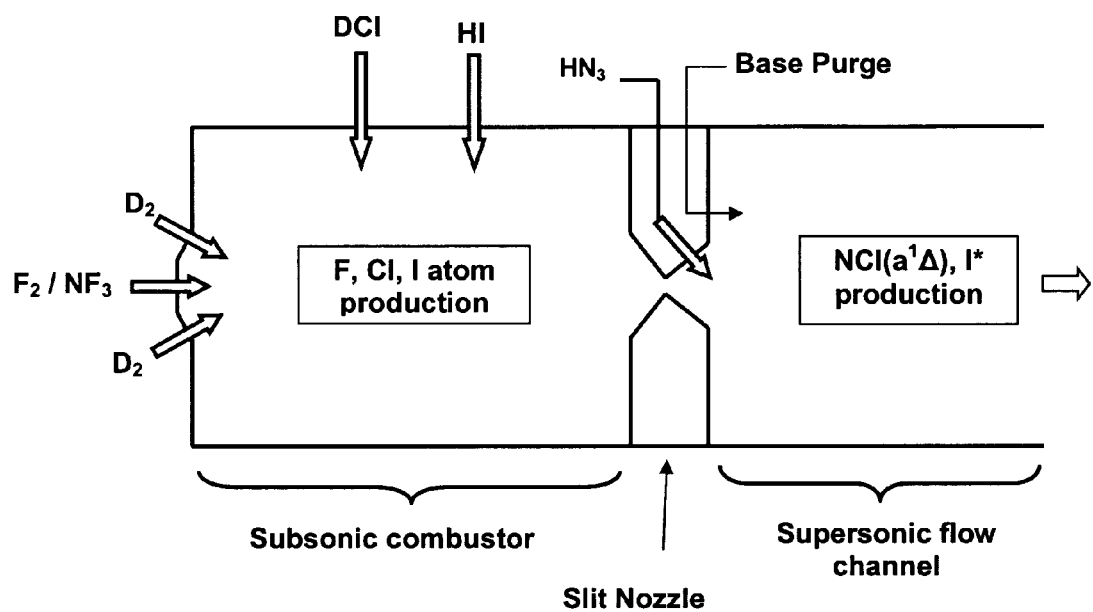
FIG. 2 is a more detailed diagram of the subsonic/supersonic flow reactor.

Laser action on the $I^*(^2P_{1/2})$–$I(^2P_{3/2})$ transition at 1.315 microns will occur in the supersonic region downstream of the $HN_3$ injectors shown in FIGS. 1 and 2. In this embodiment the apparatus includes a subsonic combustion section comprised of the combustion chamber and $D_2$, $F_2$, $NF_3$, DCl and HI injectors, the supersonic nozzle comprised of a converging-diverging nozzle, and the $HN_3$ injectors. The subsonic combustion section provides a source of fluorine atoms by way of the chemical reactions of equations 11-13. Injections of DCl and HI result in the reactions of equations 14 and 15. The converging-diverging nozzle separates the upstream and downstream sections and converts the high pressure, high temperature, subsonic gas flow in the combustion section into a low pressure, low temperature, supersonic gas flow. The injection of $HN_3$ into the downstream supersonic section of the flow device results in the production of $NCl(a^1\Delta)$ and $I^*(^2P_{1/2})$ via reactions of equations 16-18.

The pressure in the combustion chamber may be monitored with a capacitance monometer. The static pressure and temperature in the supersonic region downstream of the nozzle exit may be monitored with a series of capacitance monometers and thermocouples. The gaseous $F_2$ may be stored as a 30-50% mixture in He, while the gaseous $HN_3$ may be stored as a 5-20% mixture in helium. Helium diluent (Matheson, 99.995%), $D_2$ (Matheson, 99+ %), $NF_3$ (Spectra Gas, 99%), DCl (Cambridge Isotopes, 99%), and HI (Matheson, 99%) are used without further purification.

There exist a number of alternative fuels and schemes for the AGIL laser. Deuterium azide ($DN_3$) could be substituted for hydrogen azide ($HN_3$). In addition, deuterium iodide (DI) could be substituted for hydrogen iodide (HI). In principle, nitrogen trichloride ($NCl_3$) could be used to replace hydrogen or deuterium azide ($HN_3/DN_3$).

The invention claimed is:

1. A supersonic, combustion driven, continuous wave all gas phase iodine laser comprised of
 a. a flow device having gas flow from an upstream subsonic combustor section through a converging-diverging supersonic slit nozzle to a downstream supersonic section;
 b. a source of fluorine gas ($F_2$) injected into the upstream section of said flow device;
 c. a source of deuterium ($D_2$) gas injected into the upstream section of said flow device;
 d. a source of nitrogen trifluoride ($NF_3$) gas injected into the upstream section of said flow device;
 e. a source of deuterium chloride (DCl) gas injected into the upstream section of said flow device;
 f. a source of hydrogen iodide (HI) gas injected into the upstream section of said flow device;
 g. a source of hydrogen azide ($HN_3$) gas injected into the downstream section of said flow device;
 h. an optical resonator intersecting said flow device downstream of said supersonic flow section, whereby the transformation of the fluorine, $NF_3$, DCl, HI, and $HN_3$ gas phase chemical reagents generates a 1.315 micron laser radiation within said optical resonator.

2. The supersonic gas phase iodine laser of claim 1, wherein deuterium azide ($DN_3$) gas is substituted for $HN_3$ gas.

3. The supersonic gas phase iodine laser of claim 1, wherein deuterium iodide (DI) gas is substituted for HI gas.

4. The supersonic gas phase iodine laser of claim 1, wherein the source of hydrogen azide ($HN_3$) or deuterium azide ($DN_3$) is comprised of an auxiliary chemical reactor which continuously generates said $HN_3$ or $DN_3$ gas.

5. A method for generating a continuous wave laser on the electronic $I^*(^2P_{1/2})$–$I(^2P_{3/2})$ transition of atomic iodine at 1.315 microns from the $NCl(a^1\Delta)+I(^2P_{3/2})$ energy transfer reaction using a transverse flow device having gas flow from an upstream subsonic combustor section through a converging-diverging supersonic slit nozzle to a downstream supersonic section and an intersecting optical resonator, the method comprising:
 (a) injecting $D_2$, $F_2$, and $NF_3$ at a starting point into said upstream subsonic combustor section, whereby fluorine atoms are generated;
 (b) injecting DCl gas into said subsonic combustor section downstream of the injection points of said $D_2$, $F_2$, and $NF_3$ gases;
 (c) injecting HI gas into said subsonic combustor section downstream of the injection point of said DCl gas;
 (d) constricting the flow of gases from said upstream subsonic combustor section through a converging-diverging supersonic slit nozzle to a downstream supersonic section;
 (e) injecting $HN_3$ gas into said downstream supersonic section, whereby $NCl(a^1\Delta)$ gas is produced and combines with $I(^2P_{3/2})$ from said upstream subsonic combustor section to produce $I^*(^2P_{1/2})$; and
 (f) providing an intersecting optical resonator downstream of the $HN_3$ gas injection point, to thereby extract the laser light.

6. The method of claim 5, wherein step (a) is comprised of injecting fluorine atoms (F) directly into said upstream subsonic combustor section.

7. The method of claim 5, wherein deuterium azide $DN_3$ gas is substituted for $HN_3$ gas in step (e).

8. The method of claim 5, wherein deuterium iodide (DI) gas is substituted for HI gas in step (c).

9. The method of claim 5, wherein the source of hydrogen azide ($HN_3$) or deuterium azide ($DN_3$) is comprised of an auxiliary chemical reactor which continuously generates said $HN_3$ or $DN_3$ gas.

* * * * *